US006938569B2

(12) United States Patent
Burg

(10) Patent No.: US 6,938,569 B2
(45) Date of Patent: Sep. 6, 2005

(54) SURFACE EFFECT SHIP ADVANCEMENTS

(76) Inventor: Donald E. Burg, 15840 SW. 84th Ave., Miami, FL (US) 33157

( * ) Notice: Subject to any disclaimer, the term of this patent is extended or adjusted under 35 U.S.C. 154(b) by 0 days.

(21) Appl. No.: 10/889,894

(22) Filed: Jul. 12, 2004

(65) Prior Publication Data

US 2005/0166823 A1 Aug. 4, 2005

Related U.S. Application Data

(63) Continuation-in-part of application No. 10/274,654, filed on Oct. 21, 2002, now abandoned, and a continuation-in-part of application No. 10/286,712, filed on Nov. 1, 2002, now abandoned, and a continuation-in-part of application No. 10/337,490, filed on Jan. 1, 2003, now abandoned, and a continuation-in-part of application No. 10/777,426, filed on Feb. 11, 2004, now abandoned, and a continuation-in-part of application No. 10/784,443, filed on Feb. 23, 2004.

(51) Int. Cl.[7] .................................................. B63B 1/38
(52) U.S. Cl. ..................................... 114/67 A; 180/126
(58) Field of Search ............................ 114/67 A, 56.1, 114/288, 289, 290; 180/126, 127, 128

(56) References Cited

U.S. PATENT DOCUMENTS 4,489,667 A * 12/1984 Moore et al. ............. 114/67 A
4,494,473 A * 1/1985 Simpson ................... 114/67 A
4,615,407 A * 10/1986 Wilson et al. .............. 108/128
4,646,866 A * 3/1987 Bertrand et al. ............ 180/126
4,739,719 A * 4/1988 Burg ........................ 114/67 A
4,890,564 A * 1/1990 Burg ........................ 114/67 A
5,000,107 A * 3/1991 Burg ........................ 114/67 A
5,176,095 A * 1/1993 Burg ........................ 114/67 A
5,415,120 A * 5/1995 Burg ........................ 114/67 A
5,746,146 A * 5/1998 Bixel, Jr. .................. 114/67 A
5,839,384 A * 11/1998 Burg ........................ 114/67 A

* cited by examiner

*Primary Examiner*—Lars A. Olson

(57) ABSTRACT

Presented is an advanced Surface Effect Ship (SES) that offers the high efficiencies of the pressurized air cushion supported generic flexible bow and stern seal SES but without the generic SES's shortcomings that are due largely to its generally about 80 percent total hull width flexible bow and stem seals. Advantages are accomplished by the instant invention by use of forward extending rigid bow members positioned both sides of a pressurized hull supporting gas cushion such that the width of the sidehulls, preferably, make up a majority of the width of the instant invention advanced surface effect ship with the remainder, normally less than 35 percent of vessel width, made up by a gas cushion forward moveable seal member disposed between the bow members. Gas cushions may extend forward into undersides of the sidehull bow members to further reduce wetted area resistance. Longitudinally oriented fluid fences may be incorporated to at least partially separate portions of the gas cushion and thereby dampen pressure perturbations in the gas cushion(s). A third bow member may be utilized between port and starboard bow members for some applications.

68 Claims, 7 Drawing Sheets

SURFACE EFFECT SHIP ADVANCEMENTS

CROSS REFERENCE TO OTHER APPLICATIONS

This application is a continuation-in-part to Applicant's earlier filed application Ser. No. 10/274,654 filed Oct. 21, 2002 now abandoned, Ser. No. 10/286,712 filed Nov. 1, 2002 now abandoned, Ser. No. 10/337,490 filed Jan. 1, 2003 now abandoned, Ser. No. 10/777,426 filed Feb. 11, 2004 now abandoned, and Ser. No. 10/784,443 filed Feb. 23, 2004.

BACKGROUND OF THE INVENTION

Marine Surface Effect Ships (SES) in their generic form have a upper hull that is rather flat on its underside with downward extending asymmetrical catamaran sidehull portions either side. These asymmetrical sidehull portions are connected transversely fore and aft by flexible seals. The boundary of the space thus formed is pressurized with air supplied by powered blowers to thereby form a deep air layer between the hull and the water's surface. This results in a vessel that has little water contact and is therefore quite efficient at high speeds in calm water.

Major shortcomings of the generic SES are that: 1) The wide barn door effect of the flexible bow seal contributes to a drastic increase in resistance and poor sea keeping characteristics when moderate to high seas are encountered, 2) The flexible bow seal allows waves to enter and upset the stability of the supporting gas cushion that is really a huge gas spring. This results in a very uncomfortable 2–4 cycle per second oscillation that is commonly known as the SES "cobblestone" ride effect, and 3) The large full span flexible bow and stern seals are rather expensive and high maintenance.

Applicant has successfully addressed the shortcomings of the generic SES with his patented SEACOASTER SECAT (Surface Effect CATamaran) inventions. SEACOASTER has fine entry bows on long and slender sidehulls with gas cushion recesses built into their undersides. Blower pressurized air is supplied to the two recesses thereby essentially forming two parallel surface effect ships mounted to a common hull structure. The shortcomings of the generic SES are avoided since there are no high cost and maintenance flexible seals and there is no gas cushion between the sidehulls. The fine entry bows of the SEACOASTER's sidehulls provide an excellent ride in rough seas and there is no "cobblestone" ride as is experienced with the generic SES.

However, compared to a generic SES of similar size, the SEACOASTER inventive hull has two shortcomings: 1) It has about 30 percent less air cushion surface area and hence requires a higher cushion pressure due to the non-pressurized area between its sidehulls and 2) It has more wetted area since it has four sidewalls, one on each side of each of its air cushions, while the generic SES has only two sidewalls. Even with these relatively minor shortcomings, the SEACOASTER is proving to be a very successful concept due to its high efficiency compared to conventional hull forms such as monohulls and catamarans and its shallow draft, excellent seakeeping, and stability.

The instant invention proposed herein addresses the minor shortcomings of the SEACOASTER concept while still designing out the major shortcomings of the generic SES. This will be understood upon review of the following sections.

SUMMARY OF THE INVENTION

It is a primary object of the instant invention to offer an advanced surface effect ship that has a gas cushion forward moveable seal member with lower water contacting portions that extend over less than forty-five percent of a width of the advanced surface effect ship as measured when said advanced surface effect ship is moving forward at high speed in a calm sea.

It is a directly related object of the invention that the lower water contacting portions of the gas cushion forward moveable seal member will extend over less than forty percent of a width of the advanced surface effect ship when said advanced surface effect ship is moving forward at high speed in a calm sea.

It is a directly related object of the invention that the lower water contacting portions of the gas cushion forward moveable seal member will extend over less than thirty-five percent of a width of the advanced surface effect ship when said advanced surface effect ship is moving forward at high speed in a calm sea.

It is a further directly related object of the invention that the lower water contacting portions of the gas cushion forward moveable seal member will extend over less than thirty percent of a width of the advanced surface effect ship when said advanced surface effect ship is moving forward at high speed in a calm sea.

It is a directly related object of the invention that the lower water contacting portions of the gas cushion forward moveable seal member will preferably extend over less than twenty-five percent of a width of the advanced surface effect ship when said advanced surface effect ship is moving forward at high speed in a calm sea.

It is yet another object of the invention that lower water contacting portions of the port and starboard bows, when said advanced surface effect ship is moving forward at high speed in a calm sea, extend forward of an average position of lower water contacting portions of the gas cushion forward moveable seal member by at least five percent of a waterline length of the advanced surface effect ship.

It is yet another object of the invention that lower water contacting portions of the port and starboard bows, when said advanced surface effect ship is moving forward at high speed in a calm sea, extend forward of an average position of lower water contacting portions of the gas cushion forward moveable seal member by at least five percent of a waterline length of the advanced surface effect ship.

It is another object of the invention that lower water contacting portions of the port and starboard bows, when said advanced surface effect ship is moving forward at high speed in a calm sea, extend forward of an average position of lower water contacting portions of the gas cushion forward moveable seal member by at least ten percent of a waterline length of the advanced surface effect ship.

It is a further object of the invention that lower water contacting portions of the port and starboard bows, when said advanced surface effect ship is moving forward at high speed in a calm sea, extend forward of an average position of lower water contacting portions of the gas cushion forward moveable seal member by at least fifteen percent of a waterline length of the advanced surface effect ship.

It is yet another object of the invention that lower water contacting portions of the port and starboard bows, when said advanced surface effect ship is moving forward at high speed in a calm sea, extend forward of an average position of lower water contacting portions of the gas cushion forward moveable seal member by at least twenty percent of a waterline length of the advanced surface effect ship.

It is a further object of the invention that the gas cushion forward moveable seal member may be composed of more than one element.

A related object of the invention is that elements of the gas cushion forward moveable seal member are in mechanical communication with the hull of the advanced surface effect ship by means of a rotatable device.

A further related object of the invention is that the gas cushion forward moveable seal member be at least mainly constructed of rigid materials.

A related object of the invention is that the gas cushion forward moveable seal member be at least mainly constructed of semi-rigid materials.

Another related object of the invention is that the gas cushion forward seal member be at least mainly constructed of flexible materials.

It is yet another object of the invention that upper forward portions of the gas cushion forward moveable seal member are, at least in their majority, disposed behind hull structure disposed between the port and starboard bows.

It is a directly related object of the invention that the hull structure disposed forward of upper portions of the gas cushion forward moveable seal member, as seen in vertical transverse planes of the advanced surface effect ship, be angled to horizontal over a majority of its width.

A directly related object of the invention is that said hull structure disposed forward of the upper forward portions of the gas cushion forward moveable seal member, as seen in vertical transverse planes of the hull, at least in its majority be of an inverted-V shape.

Another object of the invention is that there be a third bow member disposed, at least in its majority, forward of said gas cushion forward moveable seal member.

Yet another object of the invention is that forward water contacting portions of the port and starboard bow members include artificially pressurized gas cushion portions disposed in their undersides.

A directly related object of the invention is that the artificially pressurized gas cushion portions disposed in the undersides of the port and starboard bow members extend, as seen when the advanced surface effect ship is moving forward at high speed in a calm sea, forward of an average of longitudinal positions, as seen in longitudinal vertical planes of the advanced surface effect ship, of forward water contacting portions of the gas cushion forward moveable seal member by at least five percent of a waterline length of the advanced surface effect ship.

Another directly related object of the invention is that the artificially pressurized gas cushion portions disposed in the undersides of the port and starboard bow members extend forward of an average of longitudinal positions of forward water contacting portions of the gas cushion forward moveable seal member by at least ten percent of a waterline length of the advanced surface effect ship.

Yet another directly related object of the invention is that the artificially pressurized gas cushion portions disposed in the undersides of the port and starboard bow members extend forward of an average of longitudinal positions of forward water contacting portions of the gas cushion forward moveable seal member by at least fifteen percent of a waterline length of the advanced surface effect ship.

Yet another directly related object of the invention is that the artificially pressurized gas cushion portions disposed in the undersides of the port and starboard bow members extend forward of an average of longitudinal positions of forward water contacting portions of the gas cushion forward moveable seal member by at least twenty percent of a waterline length of the advanced surface effect ship.

It is another related object of the invention that the gas cushion portions disposed in the undersides of the port and starboard bow members diverge either side of vertical sidehull longitudinal planes going aft from their forward portions.

It is a directly related object of the invention that said vertical longitudinal plane is a vertical longitudinal centerline plane of the port or the starboard sidehull.

It is a further object of the invention that lower portions of the port and starboard bow members be at least partially truncated aft of the gas cushion forward moveable bow member.

Yet another object of the invention is that longitudinally oriented fluid fences extend downward from upper surfaces of the gas cushion recess to thereby restrict fluid flow in the gas cushion.

A directly related object of the invention is that, when the advanced surface effect ship is moving forward at high speed in a calm sea, the fluid fences are not in contact with a water surface over a majority of their length.

It is a further object of the invention that the artificially pressurized gas cushion may have separate compartments.

It is yet another object of the invention that the gas cushion aft seal member, as seen in a vertical transverse plane of the advanced surface effect ship, is angled to horizontal over a majority of its width.

A directly related object of the invention is that said gas cushion aft seal member, as seen in a vertical transverse plane of the advanced surface effect ship, includes at least two inverted-V shaped portions.

It is another object of the invention that a third bow member may be disposed, at least in part, between the port and starboard bow members.

It is a related object of the invention gas cushion forward moveable seal member extend inward from the port and the starboard sidehulls.

It is yet another related object of the invention that the port and starboard moveable seal members have lower water contacting portions that extend between lower portions of the respective port and starboard sidehulls and lower portions of the third bow member.

It is another related object of the invention that forward water contacting portions of the third bow member include an artificially pressurized gas cushion portion disposed in its underside.

Yet another related object of the invention is that the artificially pressurized gas cushion portion disposed in the underside of the third bow member extend, as seen when the advanced surface effect ship is moving forward at high speed in a calm sea, forward of an average of longitudinal positions, as seen in longitudinal vertical planes of the advanced surface effect ship, of forward water contacting portions of the gas cushion forward moveable seal members by at least five percent of a waterline length of the advanced surface effect ship.

A further related object of the invention is that the artificially pressurized gas cushion portion disposed in the underside of the third bow member extend forward of an average of longitudinal positions of the forward water contacting portion of the gas cushion forward moveable seal member by at least ten percent of a waterline length of the advanced surface effect ship.

A further related object of the invention is that the artificially pressurized gas cushion portion disposed in the underside of the third bow member extend forward of an average of longitudinal positions of forward water contacting portions of the gas cushion forward moveable seal by at least fifteen percent of a waterline length of the advanced surface effect ship.

A further related object of the invention is that the artificially pressurized gas cushion portion disposed in the underside of the third bow member extend forward of an average of longitudinal positions of forward water contacting portions of the gas cushion port and starboard forward moveable seal members by at least twenty percent of a waterline length of the advanced surface effect ship.

Another object of the invention is that gas cushion port and starboard forward moveable seal members each include two or more elements.

Still another object of the invention is that elements of the gas cushion forward moveable seal member are in mechanical communication with the hull of the advanced surface effect ship by means of at least one rotatable device.

A further object of the invention is that the gas cushion forward moveable seal member be at least mainly constructed of rigid materials.

Another object of the invention is that elements of the gas cushion forward moveable seal member be at least mainly constructed of semi-rigid materials.

Still another object of the invention is that elements of the gas cushion forward moveable seal member be at least mainly constructed of flexible materials.

DETAILED DESCRIPTION

Figure 1:
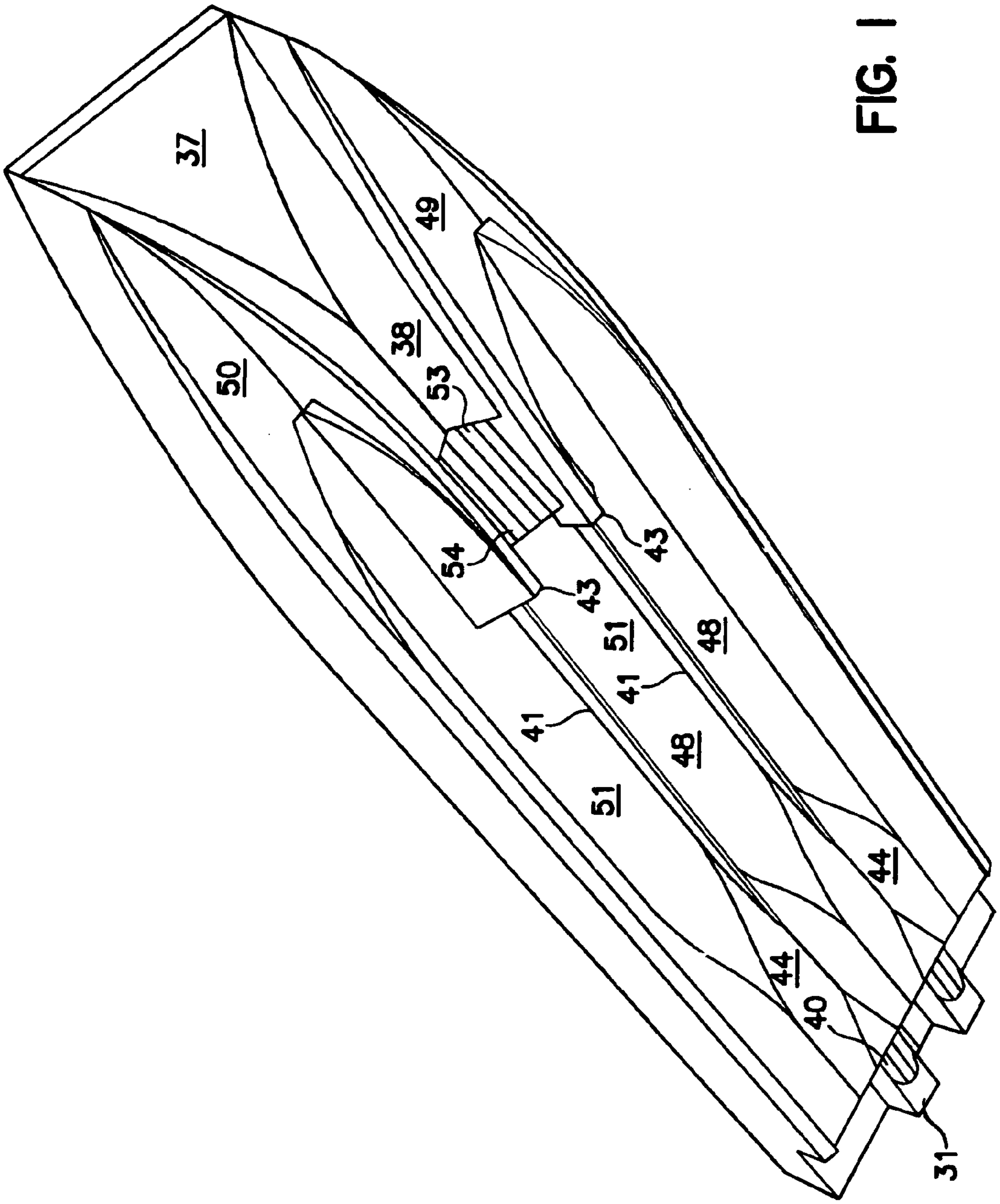
FIG. 1 presents an underside three-dimensional perspective of a preferred embodiment of the instant invention advanced surface effect ship. Note the moveable, in relation to the instant invention's hull, gas cushion forward seal member disposed between the port and starboard bow members. Note also that the bow members are truncated on their lower portions going aft. This insures a large surface area air cushion and minimum wetted area resistance.

FIG. 1 presents an underside three dimensional perspective of the advanced surface effect ship 37 to the instant invention. Items to note are forward extending port bow member 49 and starboard bow member 50. These bow members extend forward of a gas cushion forward moveable seal member 53 that is preferably composed of moveable seal elements 54. In this case there is a gas cushion forward structural member 38, of a preferred inverted-V shape as shown here, that deflects oncoming waves from the moveable seal. The inverted-V shape provides good rough sea ride qualities and also presents a shape that concentrates the water coming off of the bows 49, 50 to most effectively create a gas sealing effect. Artificially pressurized gas is supplied to the gas cushion through gas discharge openings above the gas cushion forward moveable seal member 53 in this preferred embodiment of the invention. Other means of supplying pressurized gas to the gas cushion 48 can be employed and are considered to be within the scope of the instant invention.

The pressurized gas is retained in the gas cushion 48 by sidehulls 42, bow members 49, 50, gas cushion forward moveable seal member 53, gas cushion recess top 51, stern seal 44 and, of course, the water surface. A set of fluid fences 41 are used here to restrict movement of fluids from one portion of the gas cushion 48 to another. It is desirable that these fluid fences 41 do not make water contact during high speed operation in order to reduce wetted area frictional resistance. Thrust is provided by propulsors 31. Some optional propulsor water inlets 40 are shown here for illustrative purposes.

Figure 2:
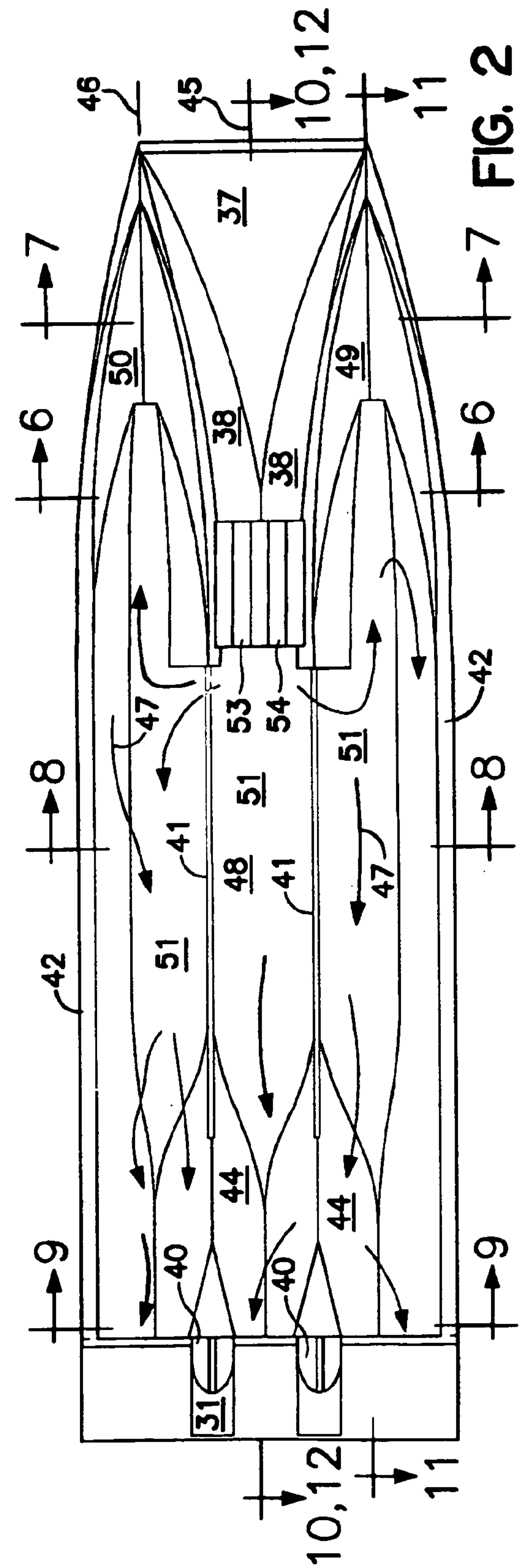
FIG. 2 is an underside plan view of the advanced surface effect ship of FIG. 1.

FIG. 2 gives a bottom plan view of the instant invention advanced surface effect ship 37. Items shown are similar to those given in FIG. 1 with the addition of gas flow arrows 47 that have been added. It shows part of the gas cushion forward moveable seal member 53. Note how far the water contacting portions of bow members 49, 50 extend forward of the water contacting portion of the gas cushion forward moveable seal 53. This is an important consideration to the instant invention advanced surface effect ship 37 since it: 1) Provides pitch stability forward of the gas cushion forward seal and 2) Allows the sidehulls to develop at least near full width where the gas cushion forward seal is located. Some definitions of the desired ranges of extension of water contacting portions of the bow members forward of the water contacting portions of the gas cushion forward seal are given in a preceding section titled SUMMARY OF THE INVENTION.

Figure 3:
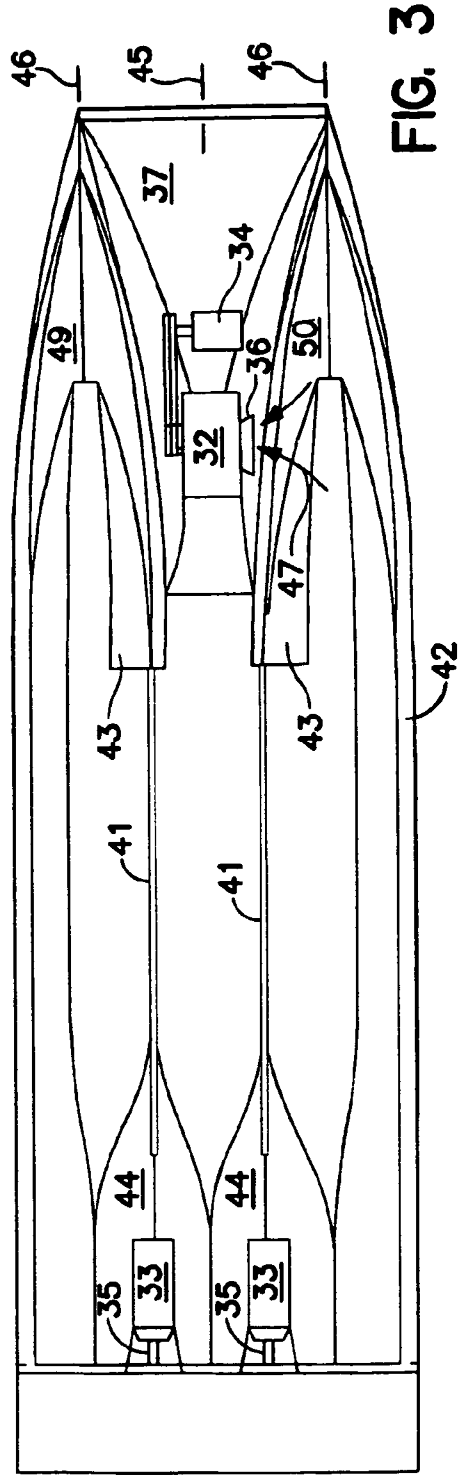
FIG. 3 is a topside plan view of the advanced surface effect ship of FIG. 1 with the main deck removed to show machinery arrangements.

FIG. 3 presents a topside plan view with the primary deck portion removed for illustrative purposes. This shows typical installation of some of the critical machinery elements. Included are propulsor drive shafts 35 and propulsor engines 33. A typical blower 32 is driven by blower drive engine 34.

Figure 4:
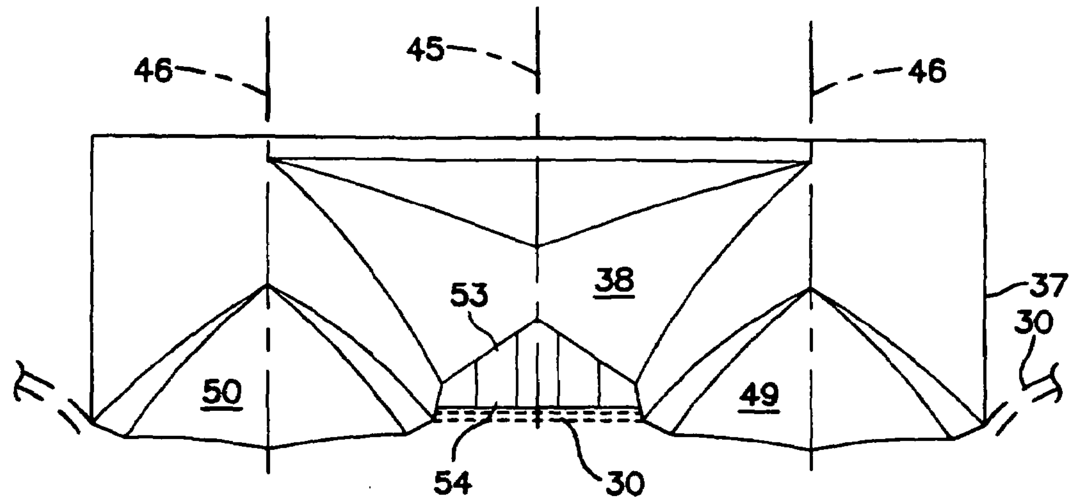
FIG. 4 gives a bow view of the preferred embodiment of the instant invention advanced surface effect ship. Five elements of a moveable seal member can be seen here.

FIG. 4 presents a bow view of the instant invention advanced surface effect ship 37. Some items shown include a vertical centerline plane 45 and sidehull vertical centerline planes 46 of the vessel. It is important to note the width of the lower water contacting portion of the gas cushion forward moveable seal 53. It is about 25 percent of the total width of the instant invention improved surface effect ship 37 proximal the gas cushion forward moveable seal 53 here which is in a desired range. Some definitions of the desired limits on percentage of gas cushion forward seal 53 width for the instant invention advanced surface effect ship are given in a preceding section titled SUMMARY OF THE INVENTION. The percentage of total vessel width of the moveable bow seal of a generic SES is more like 80 percent. The very wide moveable bow seal of the generic SES makes for an effect like pushing a barn door sideways over the surface of the water. While not a problem in calm water, the barn door effect of the generic SES's moveable bow seal results in tremendous increases in resistance and a severe degradation in ride quality as sea state increases. This is one of the major shortcomings that the instant invention improved surface effect ship avoids since its gas cushion forward moveable seal 53 is much narrower and also is primarily above a calm sea surface. The waterlines 30 are also shown here.

Figure 5:
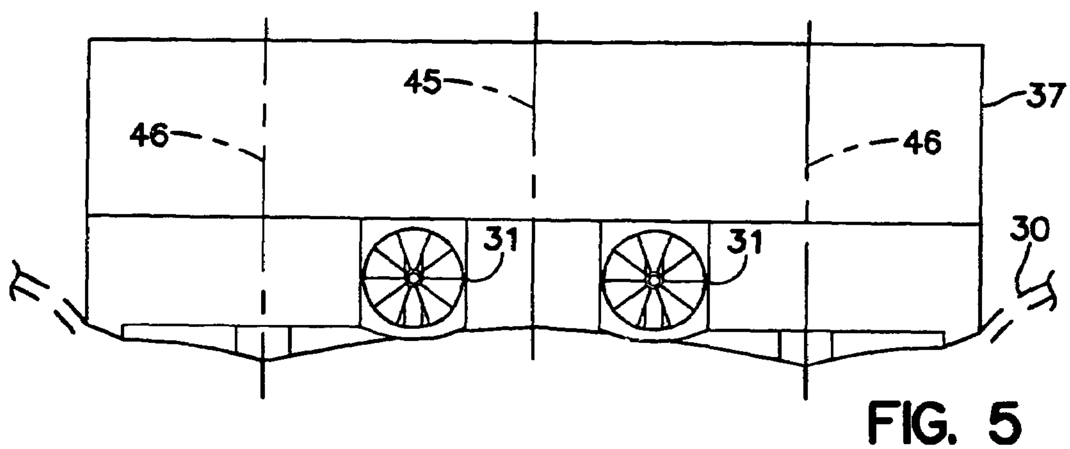
FIG. 5 is a stem view of the instant invention improved surface effect ship.

FIG. 5 shows a stem view that illustrates preferred locations of propulsors 31. Note the relatively flat shape of the gas cushion aft seal 44 which is the preferred design for low drag and good gas sealing.

Figure 6:
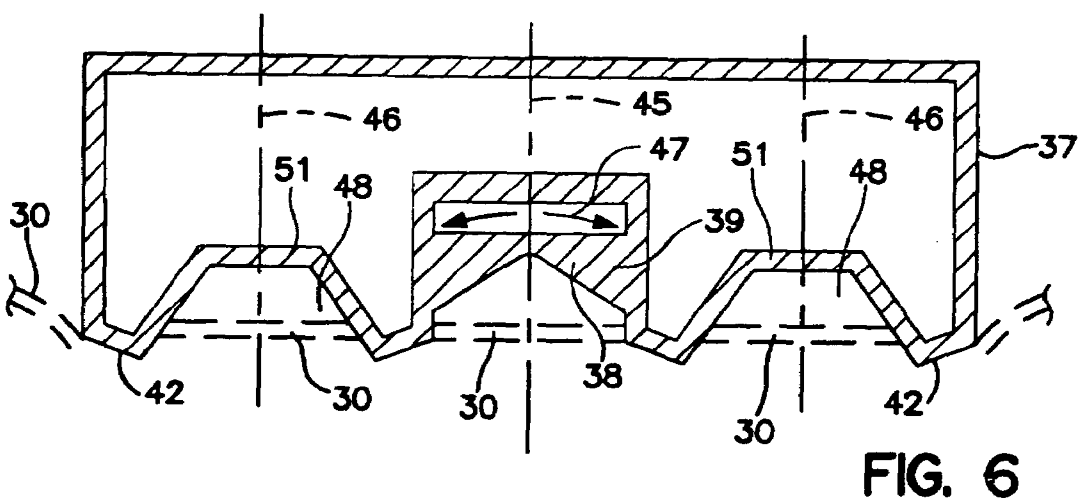
FIG. 6 presents a transverse vertical plane section, as taken through line 5—5 of FIG. 2 that shows the hull just forward of the moveable seal member.

FIG. 6 presents a vertical plane cross section, as taken through line 6—6 of FIG. 2, that shows the shape and structure of the instant invention advanced surface effect ship 37 forward of the gas cushion forward moveable seal 53. Note that this shows location of the blower discharge opening 39 just upstream of the gas cushion. The port and starboard side waterlines 30 show the desired level of the water below the gas cushions 48 here.

Figure 7:
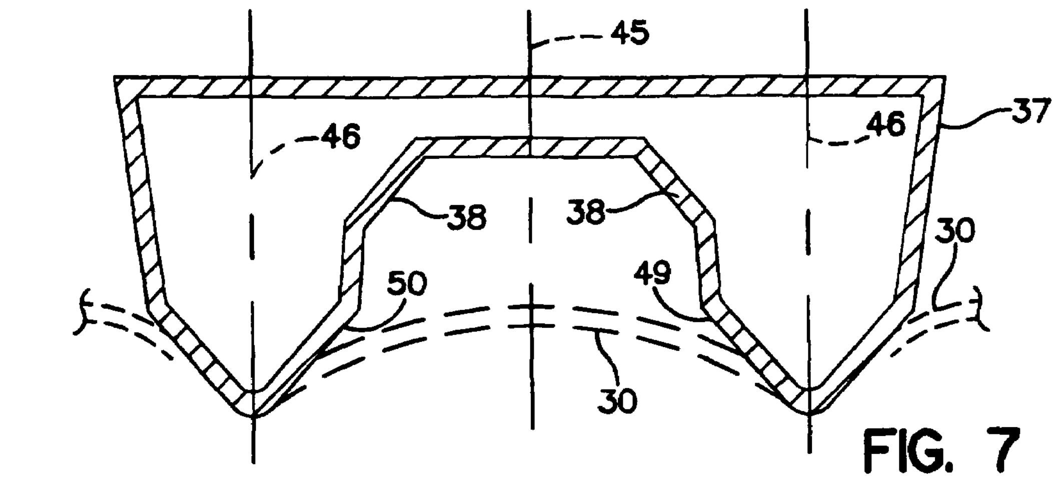
FIG. 7 is a cross-sectional view, as taken through line 7—7 of FIG. 2, that shows a section of the advanced surface effect ship forward of the gas cushion(s).

FIG. 7 is a cross section, as taken through line 7—7 of FIG. 2, that shows shape of port and starboard sidehull bows 49, 50 forward of the gas cushions.

Figure 8:
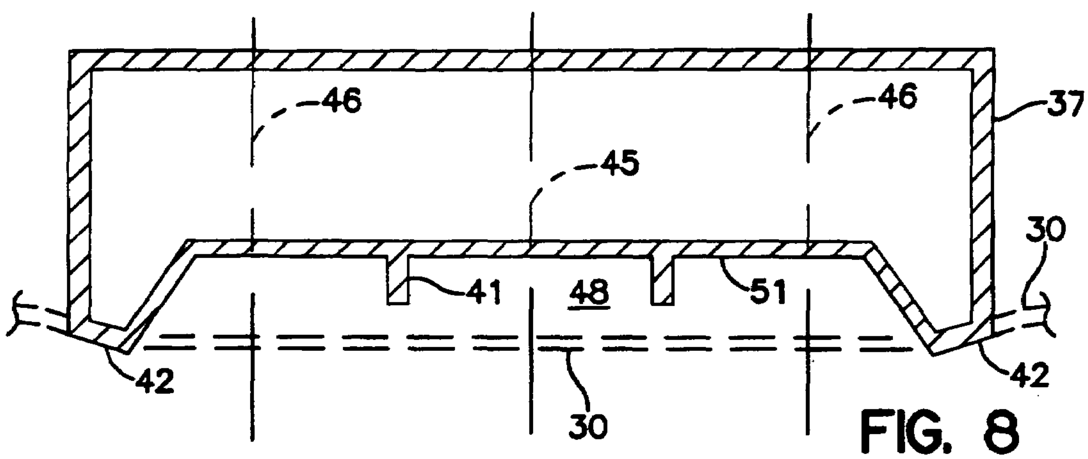
FIG. 8 presents a cross-sectional view, as taken through line 8—8 of FIG. 2. This shows fluid fences that at least partially separate portions of the gas cushion(s) to thereby reduce pressure pulses in the air cushion(s).

FIG. 8 presents a typical midship cross section, as taken through line 8—8 of FIG. 2, that shows a full span gas cushion that extends between the port and starboard sidehulls 42. Note that the waterline 30 below the gas cushion 48 does not touch the fluid fences 41 in this depiction that is for operation at high speed in a calm sea.

Figure 9:
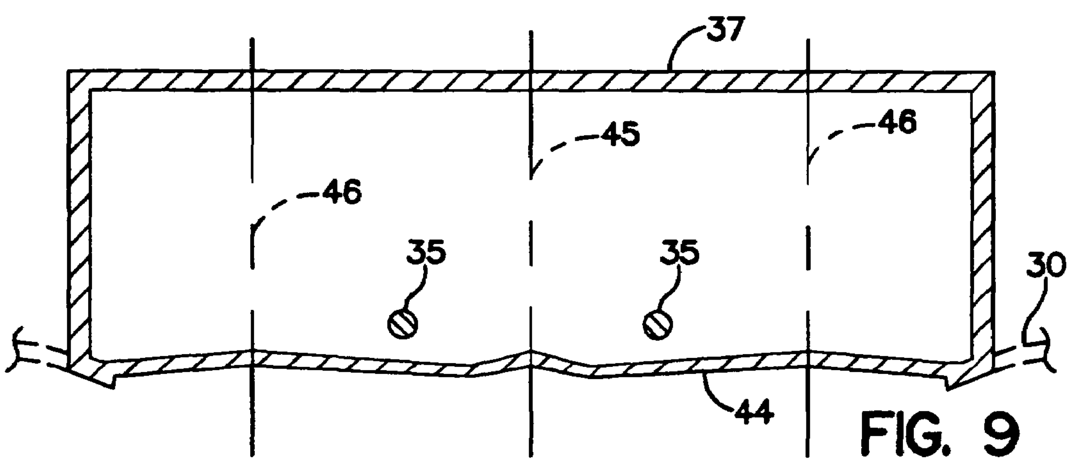
FIG. 9 gives a cross-section, as taken through line 9—9 of FIG. 2, that shows a transverse section of the gas cushion aft seal just forward of a transom.

FIG. 9 gives a vertical plane cross section, as taken through line 9—9 of FIG. 2, that shows a preferred shape of the gas cushion stem seal 44 which is near flat at this just forward of the transom section. Propulsor drive shafts 35 as intersected are shown here. It is preferable and normal that the gas cushion stem seal 44, as seen in a vertical transverse plane of the hull, be angled to horizontal over a majority of its width. A best approach is to have the gas cushion stem seal 44 made up of one or more inverted-V shapes over its forward portions to insure reduced impacts from waves that may enter in the gas cushion.

Figure 10:
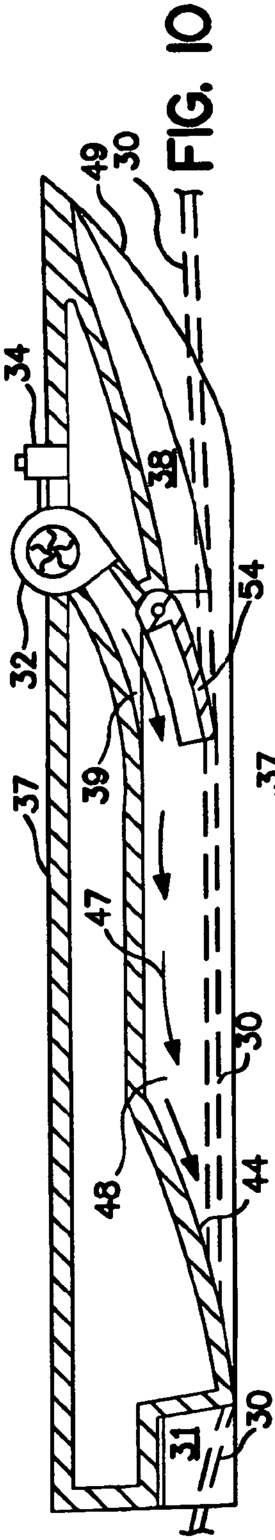
FIG. 10 presents a cross sectional view, as taken through line 10—10 of FIG. 2, that shows a section of hull through a vertical centerline plane of the hull. Note that the discharge of the gas pressurizing blower is discharged aft and downward here to aid in restoring the positions of the forward moveable seal elements when waves are encountered.

FIG. 10 presents a centerline plane cross sectional view, as taken through line 10—10 of FIG. 2 that shows a powered blower 32 driven by a blower motor 34. The discharge of the blower is above the gas cushion forward moveable seal 53 here. This approach allows the gas discharge through blower discharge opening 39 to help retain the seal elements 54 in place when waves are encountered.

In order to make definitions clear, it is stated here that the claims are drawn based on the instant invention advanced surface effect ship 37 running forward at high speed in calm seas with the gas cushion(s) pressurized. Ideally, this would be at a bow up trim angle of one and one-half to 2 and one-half degrees; however, so long as performance is not adversely affected other trim angles are acceptable. High speed is defined herein as 15 knots or greater.

Figure 11:
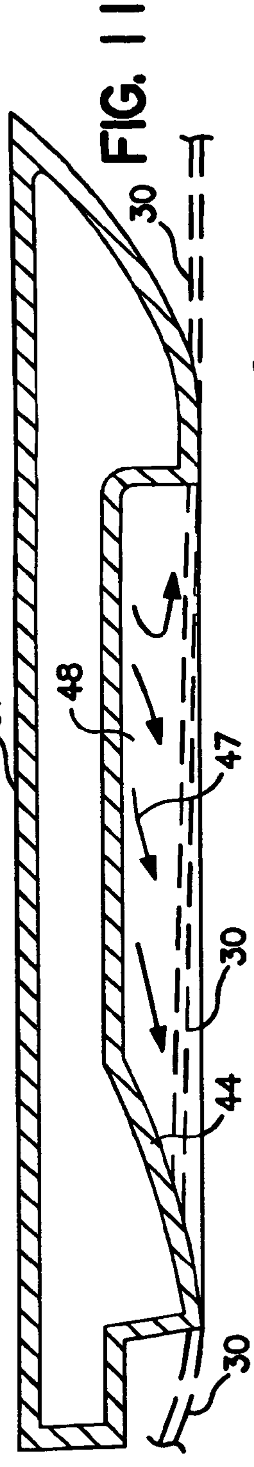
FIG. 11 is a cross sectional view, as taken through line 11—11 of FIG. 2, that shows part of an air cushion recess in way of a sidehull's vertical centerline plane.

FIG. 11 gives a view taken through a vertical sidehull plane, as taken through line 11—11 of FIG. 2, that shows the preferred shape of the gas cushion 48 as it extends from forward in a sidehull bow 49 aft to a gas cushion aft seal 44.

Figure 12:
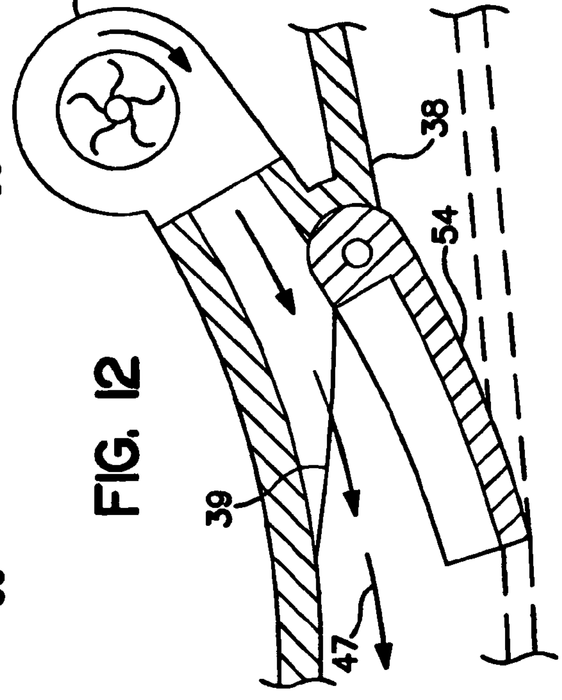
FIG. 12 presents an enlarged partial cross section, as taken through line 12—12 of FIG. 2 that shows how the blower discharge gas is preferably discharged above the moveable seal elements.

FIG. 12 presents an enlarged partial cross section, taken through line 12—12 of FIG. 2, that shows how gas discharge from a powered blower 32 aids in retaining the gas cushion forward moveable seal elements 54 in position by supplying air forces to them.

Figure 13:
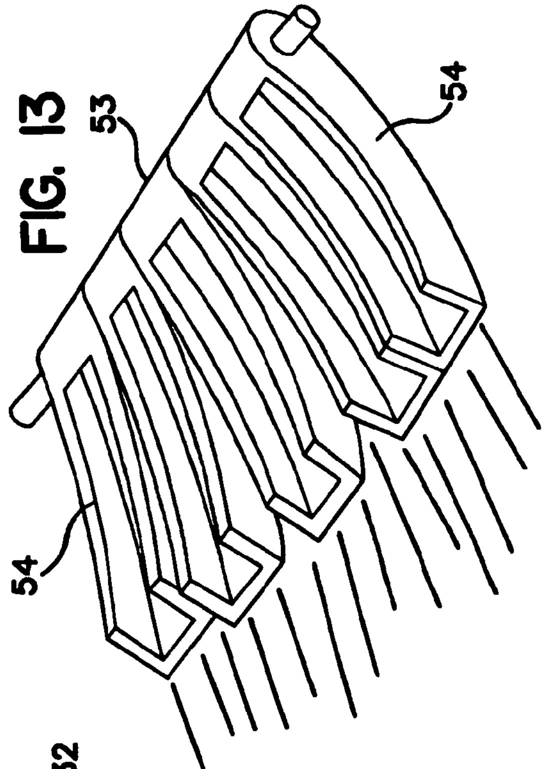
FIG. 13 presents a three-dimensional look at a moveable seal that shows five moveable seal elements. In this instance the moveable seal elements are attached by a rotatable mechanism.

FIG. 13 is a three-dimensional illustration that shows a gas cushion forward moveable seal 53 that has five seal elements 54 in this case. The seal elements 54 are preferably made of a rigid or semi-rigid material although flexible materials may also be used all or in part. Note the preferred embodiment hinge like attachment means used.

Figures 14, 15, 16:
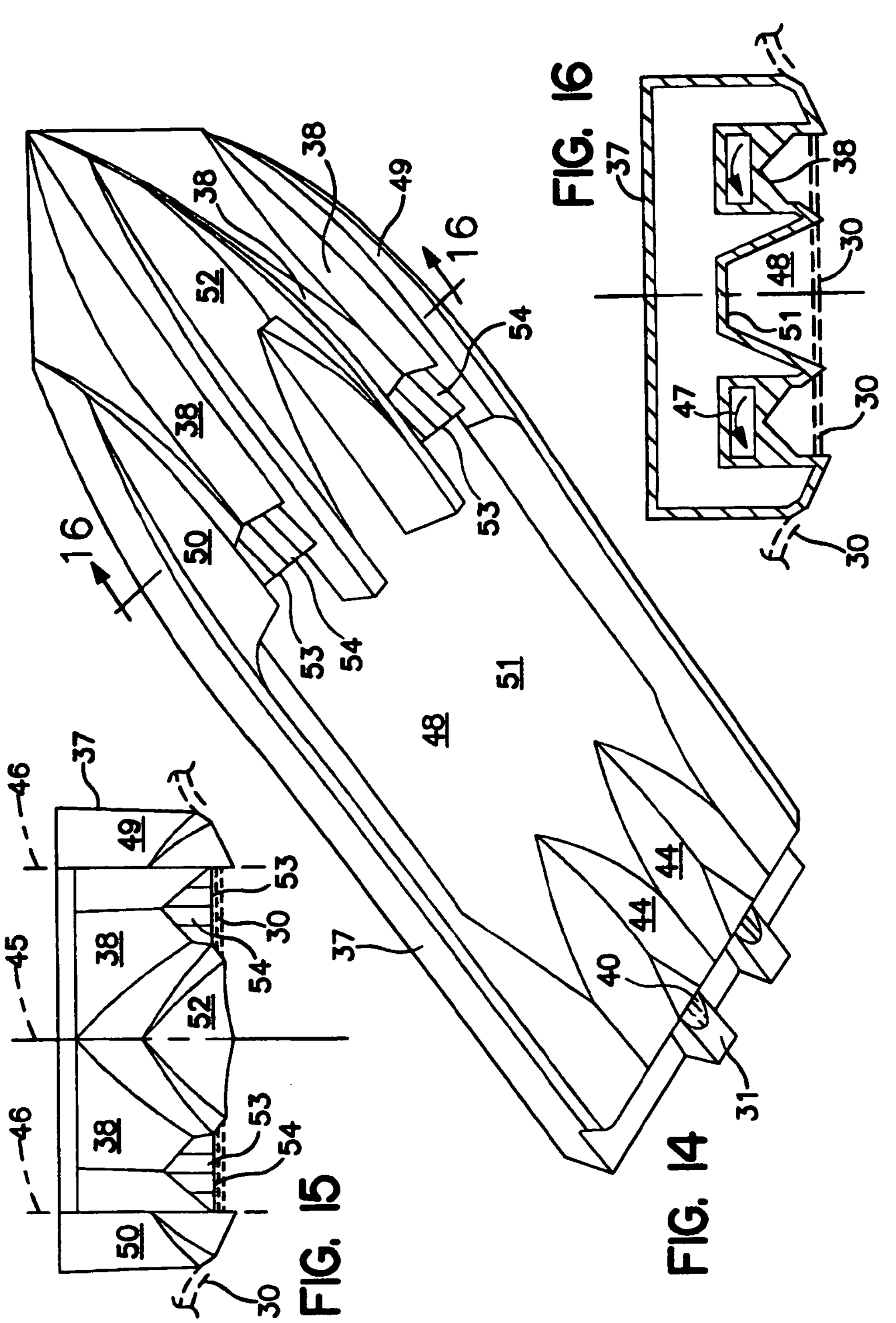
FIG. 14 gives a slight variation of the instant invention advanced surface effect ship where a third bow member has been installed between sidehulls. Note that the optional fluid fences are not used here.
FIG. 15 presents a bow view of the instant invention advanced surface effect ship of claim 14.
FIG. 16 is a cross section, as taken through line 16—16 of FIG. 14, that shows blower discharge ducting disposed either side of the center bow member. In this instance, there would normally be port and starboard blowers.

FIG. 14 presents a simple variation, in a 3-Dimensional underside perspective, of the instant invention advanced surface effect ship. In this instance there is a third bow member 52 and partial port and starboard bows 49, 50. There are two gas cushion forward moveable seal members 53 here that extend between the port and starboard bows 49, 50 and the third bow member 52. There would, in the preferred embodiment here, be blowers discharging proximal both forward seal members 53. Note that the optional gas fences have been eliminated here. While desirable, it not necessary to incorporate the gas fences in any of the instant invention advanced surface effect ships shown herein.

FIG. 15 presents a bow view of the instant invention advanced surface effect ship 37 shown in FIG. 14. Note the gas cushion forward moveable seals 53 here.

FIG. 16 is a cross section, as taken through line 16—16 of FIG. 14, that shows the hull shape forward of the gas cushion forward moveable seals. Note the blower gas flow discharges 39 here.

Figure 17:
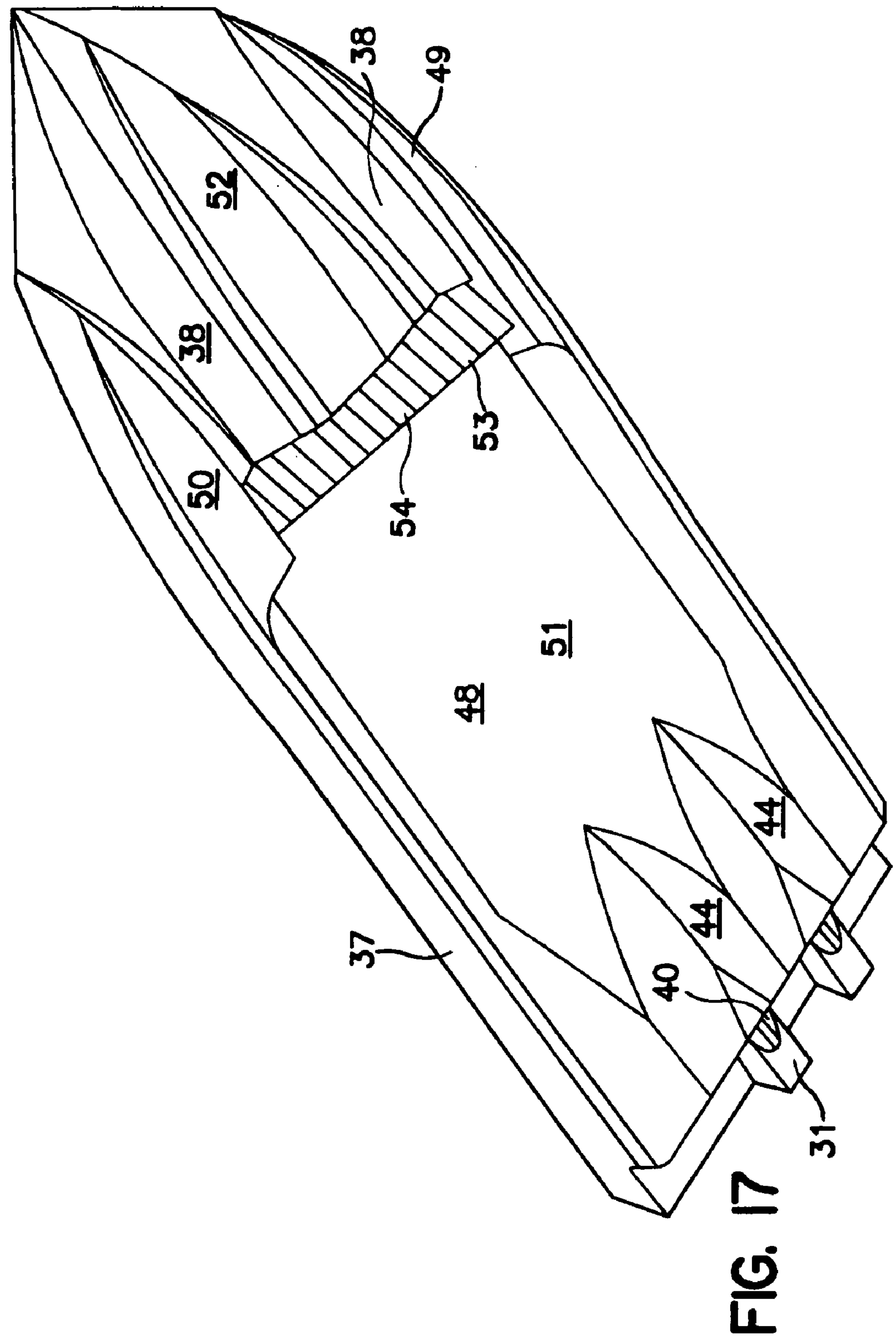
FIG. 17 presents a three-dimensional underside view of a variation of that presented in FIG. 1. In this case, a third bow member has been installed forward of the gas cushion forward moveable seal to depress waves before they encounter the forward moveable seal. This insures a less disturbed gas cushion when waves are encountered.

FIG. 17 presents a three-dimensional underside view of a variation of that presented in FIG. 1. In this case, a third bow 52 has been deployed forward of the gas cushion forward moveable seal 53 that stretches from port to starboard bows 49, 50. This approach simply give a bow forward of the moveable seal 53 to thereby reduce the effect of oncoming waves on a portion of the gas cushion forward moveable seal 53.

While the invention has been described in connection with a preferred and several alternative embodiments, it will be understood that there is no intention to thereby limit the invention. On the contrary, there is intended to be covered all alternatives, modifications, and equivalents as may be included within the spirit and scope of the invention as defined by the appended claims, which are the sole definition of the invention.

What I claim is:

1. In an advanced surface effect ship wherein said advanced surface effect ship includes port and starboard sidehulls that include bow members and is supported upon a water surface in part by an artificially pressurized gas cushion and wherein said gas cushion is restrained by the port and starboard sidehulls, a gas cushion forward moveable, in relation to a hull of the advanced surface effect ship, seal member disposed, at least in its majority, between portions of the port and starboard bow members, a gas cushion aft seal member, and the hull of the advanced surface effect ship, the improvement comprising:

said gas cushion forward moveable seal member having water contacting portions that extend over at least a portion of a width of the advanced surface effect ship when said advanced surface effect ship is moving forward at high speed in a calm sea with its air cushion pressurized and wherein said port and starboard sidehulls include artificially pressurized gas cushion portions disposed in their undersides that extend forward of an average longitudinal position of water contacting portions of said gas cushion forward moveable seal member.

2. The advanced surface effect ship of claim 1 wherein lower water contacting portions of the gas cushion forward moveable seal member extend over less than forty-five percent of a width of the advanced surface effect ship.

3. The advanced surface effect ship of claim 1 wherein lower water contacting portions of the gas cushion forward moveable seal member extend over less than thirty-five percent of a width of the advanced surface effect ship.

4. The advanced surface effect ship of claim 1 wherein lower water contacting portions of the gas cushion forward moveable seal member extend over less than twenty-five percent of a width of the advanced surface effect ship.

5. The advanced surface effect ship of claim 1 wherein lower water contacting portions of the gas cushion forward moveable seal member extend over less than twenty percent of a width of the advanced surface effect ship.

6. The advanced surface effect ship of claim 1 wherein lower water contacting portions of the port and starboard bows extend forward of an average longitudinal position of water contacting portions of the gas cushion forward moveable seal member by at least five percent of a waterline length of the advanced surface effect ship.

7. The advanced surface effect ship of claim 1 wherein lower water contacting portions of the sidehulls extend forward of an average longitudinal position of water contacting portions of the gas cushion forward moveable seal member by at least ten percent of a waterline length of the advanced surface effect ship.

8. The advanced surface effect ship of claim 1 wherein the gas cushion forward moveable seal member is comprised of at least two elements.

9. The advanced surface effect ship of claim 8 wherein elements of the gas cushion forward moveable seal member are in mechanical communication with the hull of the advanced surface effect ship by means of a rotatable device.

10. The advanced surface effect ship of claim 1 wherein the gas cushion forward moveable seal member is at least mainly constructed of rigid materials.

11. The advanced surface effect ship of claim 1 wherein the gas cushion forward moveable seal member is at least mainly constructed of semi-rigid materials.

12. The advanced surface effect ship of claim 1 wherein the gas cushion forward moveable seal member is at least mainly constructed of flexible materials.

13. The advanced surface effect ship of claim 1 wherein upper forward portions of the gas cushion forward moveable seal member are, at least in their majority, disposed behind hull structure disposed between the port and starboard bows that is angled to horizontal over a majority of its width.

14. The advanced surface effect ship of claim 13 wherein said hull structure disposed forward of the upper forward portions of the gas cushion forward moveable seal member, as seen in a vertical transverse plane of the hull, at least in its majority of an inverted-V shape.

15. The advanced surface effect ship of claim 1 which further comprises a third bow member disposed, at least in its majority, forward of said gas cushion forward moveable seal member.

16. The advanced surface effect ship of claim 15 wherein forward water contacting portions of said third bow member include an artificially pressurized gas cushion portion disposed in its underside.

17. The advanced surface effect ship of claim 16 wherein the artificially pressurized gas cushion portion disposed in the underside of the third bow member extends forward of an average longitudinal position of water contacting portions of the gas cushion forward moveable seal member by at least five percent of a waterline length of the advanced surface effect ship.

18. The advanced surface effect ship of claim 16 wherein the artificially pressurized gas cushion portion disposed in the underside of the third bow member extends forward of an average longitudinal position of water contacting portions of the gas cushion forward moveable seal member by at least ten percent of a waterline length of the advanced surface effect ship.

19. The advanced surface effect ship of claim 1 wherein the gas cushion portions disposed in the undersides of the port and starboard bow members diverge either side of vertical sidehull longitudinal planes going aft from their forward portions.

20. The advanced surface effect ship of claim 19 wherein said vertical longitudinal planes are vertical longitudinal centerline planes of the port and starboard sidehulls.

21. The advanced surface effect ship of claim 1 wherein lower portions of the port and starboard bow members are at least partially truncated.

22. The advanced surface effect ship of claim 15 wherein lower portions of the third bow member are at least partially truncated.

23. The advanced surface effect ship of claim 15 wherein lower portions of the third bow member extend aft through portions of the forward moveable seal member.

24. The advanced surface effect ship of claim 1 wherein longitudinally oriented fluid fences extend downward from upper surfaces of the gas cushion recess to thereby restrict fluid flow in the gas cushion.

25. The advanced surface effect ship of claim 24 wherein said fluid fences are not in contact with a water surface over a majority of their length.

26. The advanced surface effect ship of claim 1 wherein the artificially pressurized gas cushion has separated compartments.

27. The advanced surface effect ship of claim 1 wherein said gas cushion aft seal member, as seen in a vertical transverse plane of the advanced surface effect ship, is angled to horizontal over a majority of its width.

28. The advanced surface effect ship of claim 1 wherein said gas cushion aft seal member, as seen in a vertical transverse plane of the advanced surface effect ship, includes at least two inverted-V shaped portions.

29. In an advanced surface effect ship wherein said advanced surface effect ship includes port and starboard sidehulls that include bow members and is supported upon a water surface in part by an artificially pressurized gas cushion and wherein said gas cushion is restrained by the port and starboard sidehulls, a gas cushion forward moveable, in relation to a hull of the advanced surface effect ship, seal member, a gas cushion aft seal member, and the hull of the advanced surface effect ship, the improvement comprising:

a third bow member disposed, at least in part, between the port and starboard bow members, and said gas cushion forward moveable seal member including at least a port moveable seal portion and a starboard moveable seal portion, and, when the advanced surface effect ship is moving forward at high speed in a calm sea with its gas cushion pressurized, water contacting portions of said port forward moveable seal portion extend inward from the port sidehull and water contacting portions of said starboard forward moveable seal portion extend inward from the starboard sidehull and wherein a forward water contacting portion of said third bow member includes an artificially pressurized gas cushion portion disposed in its underside and, at least in its majority, forward of an average longitudinal position of water contacting portions of said forward moveable seal member.

30. The advanced surface effect ship of claim 29 wherein the artificially pressurized gas cushion portion disposed in the underside of the third bow member extends forward of an average longitudinal position of water contacting portions of the gas cushion forward moveable seal member by at least five percent of a waterline length of the advanced surface effect ship.

31. The advanced surface effect ship of claim 29 wherein the artificially pressurized gas cushion portion disposed in the underside of the third bow member extends forward of an average longitudinal position of forward water contacting portions of the gas cushion forward moveable seal member by at least ten percent of a waterline length of the advanced surface effect ship.

32. The advanced surface effect ship of claim 29 wherein elements of the gas cushion forward moveable seal member is in mechanical communication with the hull of the advanced surface effect ship by means of a rotatable device.

33. The advanced surface effect ship of claim 29 wherein of the gas cushion forward moveable seal member is at least mainly constructed of rigid materials.

34. The advanced surface effect ship of claim 29 wherein the gas cushion forward moveable seal member is at least mainly constructed of semi-rigid materials.

35. The advanced surface effect ship of claim 29 wherein the gas cushion forward moveable seal member is at least mainly constructed of flexible materials.

36. The advanced surface effect ship of claim 29 wherein lower portions of the port and starboard bow members are at least partially truncated.

37. The advanced surface effect ship of claim 29 wherein lower portions of the third bow member are at least partially truncated.

38. The advanced surface effect ship of claim 29 wherein lower portions of the third bow member extend aft through portions of the forward moveable seal member.

39. The advanced surface effect ship of claim 29 wherein longitudinally oriented fluid fences extend downward from upper surfaces of the gas cushion recess to thereby restrict fluid flow in the gas cushion.

40. The advanced surface effect ship of claim 39 wherein said fluid fences are not in contact with a water surface over a majority of their length.

41. The advanced surface effect ship of claim 29 wherein the artificially pressurized gas cushion has separated compartments.

42. The advanced surface effect ship of claim 29 wherein said gas cushion aft seal member, as seen in a vertical transverse plane of the advanced surface effect ship, is angled to horizontal over a majority of its width.

43. The advanced surface effect ship of claim 29 wherein said gas cushion aft seal member, as seen in a vertical transverse plane of the advanced surface effect ship, includes at least two inverted-V shaped portions.

44. In an advanced surface effect ship wherein said advanced surface effect ship includes port and starboard sidehulls that include bow members and is supported upon a water surface in part by an artificially pressurized gas cushion and wherein said gas cushion is restrained by the port and starboard sidehulls, a gas cushion forward moveable, in relation to a hull of said advanced surface effect ship, seal member disposed, at least in its majority, between the port and starboard bow members, a gas cushion aft seal member, and the hull of the advanced surface effect ship, the improvement comprising:

water contacting portions of the port and starboard bow members, when said advanced surface effect ship is moving forward at high speed in a calm sea with its gas cushion pressurized, extend forward of an average longitudinal position of water contacting portions of the gas cushion forward moveable seal member and wherein lower inboard portions of said port and starboard bow members are at least partially truncated.

45. The advanced surface effect ship of claim 44 wherein forward water contacting portions of said port and starboard bow members include artificially pressurized gas cushion portions disposed in their undersides that extend forward of an average longitudinal position of water contacting portions of the gas cushion forward moveable seal member.

46. The advanced surface effect ship of claim 45 wherein the pressurized gas cushion portions disposed in the undersides of the port and starboard bow members extend forward of an average longitudinal position of water contacting portions of the gas cushion forward moveable seal member by at least five percent to of a waterline length of the advanced surface effect ship.

47. The advanced surface effect ship of claim 45 wherein the artificially pressurized gas cushion portions disposed in the undersides of the port and starboard bow members extend forward of an average longitudinal position of forward water contacting portions of the gas cushion forward moveable seal member by at least ten percent of a waterline length of the advanced surface effect ship.

48. The advanced surface effect ship of claim 45 wherein the artificially pressurized gas cushion portions disposed in the undersides of the port and starboard bow members extend forward of an average longitudinal position of forward water contacting portions of the gas cushion forward moveable seal member by at least fifteen percent of a waterline length of the advanced surface effect ship.

49. The advanced surface effect ship of claim 44 wherein lower water contacting portions of the gas cushion forward moveable seal member extend over less than forty-five percent of a width of the advanced surface effect ship.

50. The advanced surface effect ship of claim 44 wherein lower water contacting portions of the gas cushion forward moveable seal member extend over less than forty percent of a width of the advanced surface effect ship.

51. The advanced surface effect ship of claim 44 wherein lower water contacting portions of the gas cushion forward moveable seal member extend over less than thirty-five percent of a width of the advanced surface effect ship.

52. The advanced surface effect ship of claim 1 wherein lower water contacting portions of the gas cushion forward moveable seal member extend over less than twenty-five percent of a width of the advanced surface effect ship.

53. The advanced surface effect ship of claim 45 wherein the gas cushion portions disposed in the undersides of the port and starboard bow members diverge either side of their respective sidehull vertical longitudinal planes going aft from their forward portions.

54. The advanced surface effect ship of claim 53 wherein said sidehull vertical longitudinal planes are vertical longitudinal centerline planes of the port and starboard sidehulls.

55. The advanced surface effect ship of claim 44 wherein longitudinally oriented fluid fences extend downward from upper surfaces of the gas cushion recess to thereby restrict fluid flow in the gas cushion.

56. The advanced surface effect ship of claim 55 wherein said fluid fences are not in contact with a water surface over a majority of their length.

57. The advanced surface effect ship of claim 44 wherein the artificially pressurized gas cushion has separated compartments.

58. The advanced surface effect ship of claim 44 which further comprises a third bow member disposed, at least in its majority, forward of said gas cushion forward moveable seal member.

59. The advanced surface effect ship of claim 58 wherein forward water contacting portions of said third bow member includes an artificially pressurized gas cushion portion disposed in its underside.

60. The advanced surface effect ship of claim 58 wherein lower portions of the third bow member are at least partially truncated.

61. The advanced surface effect ship of claim 58 wherein lower portions of the third bow member extend aft through portions of the forward moveable seal member.

62. The advanced surface effect ship of claim 44 wherein said gas cushion aft seal member, as seen in a vertical transverse plane of the advanced surface effect ship, is angled to horizontal over a majority of its width.

63. The advanced surface effect ship of claim 44 wherein said gas cushion aft seal member, as seen in a vertical transverse plane of the advanced surface effect ship, includes at least two inverted-V shaped portions.

64. The advanced surface effect ship of claim 44 wherein the gas cushion forward moveable seal member is comprised of at least two elements.

65. The advanced surface effect ship of claim 64 wherein elements of the gas cushion forward moveable seal member are in mechanical communication with the hull of the advanced surface effect ship by means of a rotatable device.

66. The advanced surface effect ship of claim 44 wherein the gas cushion forward moveable seal member is at least mainly constructed of rigid materials.

67. The advanced surface effect ship of claim 44 wherein the gas cushion forward moveable seal member is at least mainly constructed of semi-rigid materials.

68. The advanced surface effect ship of claim 44 wherein the gas cushion forward moveable seal member is at least mainly constructed of flexible materials.

* * * * *